(12) United States Patent
Gold et al.

(10) Patent No.: US 7,657,533 B2
(45) Date of Patent: Feb. 2, 2010

(54) DATA MANAGEMENT SYSTEMS, DATA MANAGEMENT SYSTEM STORAGE DEVICES, ARTICLES OF MANUFACTURE, AND DATA MANAGEMENT METHODS

(75) Inventors: Stephen Gold, Ft. Collins, CO (US); Harald Burose, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 10/723,949

(22) Filed: Nov. 26, 2003

(65) Prior Publication Data

US 2005/0114408 A1     May 26, 2005

(51) Int. Cl.
*G06F 17/30* (2006.01)
(52) U.S. Cl. .................. 707/10; 707/101; 707/202; 707/203; 707/204; 707/205
(58) Field of Classification Search ................. 707/204, 707/203, 10, 101, 202, 205
See application file for complete search history.

(56) References Cited

U.S. PATENT DOCUMENTS

| | | | | |
|---|---|---|---|---|
| 5,479,654 A * | 12/1995 | Squibb | ................. | 707/201 |
| 5,729,743 A * | 3/1998 | Squibb | ................. | 707/203 |
| 5,870,765 A * | 2/1999 | Bauer et al. | ................. | 707/203 |
| 6,058,494 A | 5/2000 | Gold et al. | | |
| 6,145,089 A | 11/2000 | Le et al. | | |
| 6,233,589 B1 * | 5/2001 | Balcha et al. | ................. | 707/203 |
| 6,263,454 B1 | 7/2001 | Gold et al. | | |
| 6,366,987 B1 * | 4/2002 | Tzelnic et al. | ................. | 711/162 |
| 6,442,706 B1 | 8/2002 | Wahl et al. | | |
| 6,532,588 B1 * | 3/2003 | Porter | ................. | 717/170 |
| 6,542,906 B2 * | 4/2003 | Korn | ................. | 707/203 |
| 6,549,992 B1 * | 4/2003 | Armangau et al. | ................. | 711/162 |
| 6,714,952 B2 * | 3/2004 | Dunham et al. | ................. | 707/204 |
| 6,934,722 B1 * | 8/2005 | Goshey et al. | ................. | 707/204 |
| 6,934,877 B2 * | 8/2005 | Tamatsu | ................. | 714/5 |
| 7,020,665 B2 * | 3/2006 | Douceur et al. | ................. | 707/200 |
| 7,039,778 B2 * | 5/2006 | Yamasaki | ................. | 711/162 |
| 7,100,005 B2 * | 8/2006 | Pearl | ................. | 711/161 |
| 7,257,649 B2 * | 8/2007 | Rabbers et al. | ................. | 709/248 |
| 7,349,929 B2 * | 3/2008 | Pfitzner, Ingo | ................. | 707/203 |
| 2002/0040405 A1 | 4/2002 | Gold | | |
| 2002/0042892 A1 | 4/2002 | Gold | | |
| 2002/0073106 A1 * | 6/2002 | Parker et al. | ................. | 707/200 |
| 2002/0129128 A1 | 9/2002 | Gold et al. | | |
| 2002/0147733 A1 | 10/2002 | Gold et al. | | |
| 2002/0147784 A1 | 10/2002 | Gold et al. | | |
| 2002/0174139 A1 * | 11/2002 | Midgley et al. | ................. | 707/204 |
| 2003/0159136 A1 * | 8/2003 | Huang et al. | ................. | 717/171 |

(Continued)

*Primary Examiner*—Don Wong
*Assistant Examiner*—Thanh-Ha Dang

(57) ABSTRACT

Data management systems, data management system storage devices, articles of manufacture, and data management methods are described. According to one embodiment, a data management system includes a plurality of storage devices individually comprising a physical storage space, wherein the physical storage space of one of the storage devices is configured to store a baseline version of a data object and the physical storage space of an other of the storage devices is configured to store a delta version of the data object and processing circuitry configured to control storage operations of at least one of the storage devices, to process a restore request with respect to the data object, to access the delta version from the other of the storage devices responsive to the restore request, and to initiate communication of data of the baseline version and the delta version of the data object to a computer system.

39 Claims, 3 Drawing Sheets

U.S. PATENT DOCUMENTS

2004/0078602 A1* 4/2004 Rothbarth et al. ........... 713/201
2004/0123271 A1* 6/2004 Bindewald et al. .......... 717/124
2005/0015663 A1* 1/2005 Armangau et al. ............ 714/15
2005/0071390 A1* 3/2005 Midgley et al. ............. 707/204
2005/0193080 A1   9/2005 Gold et al.
2006/0075004 A1* 4/2006 Stakutis et al. .............. 707/204

* cited by examiner

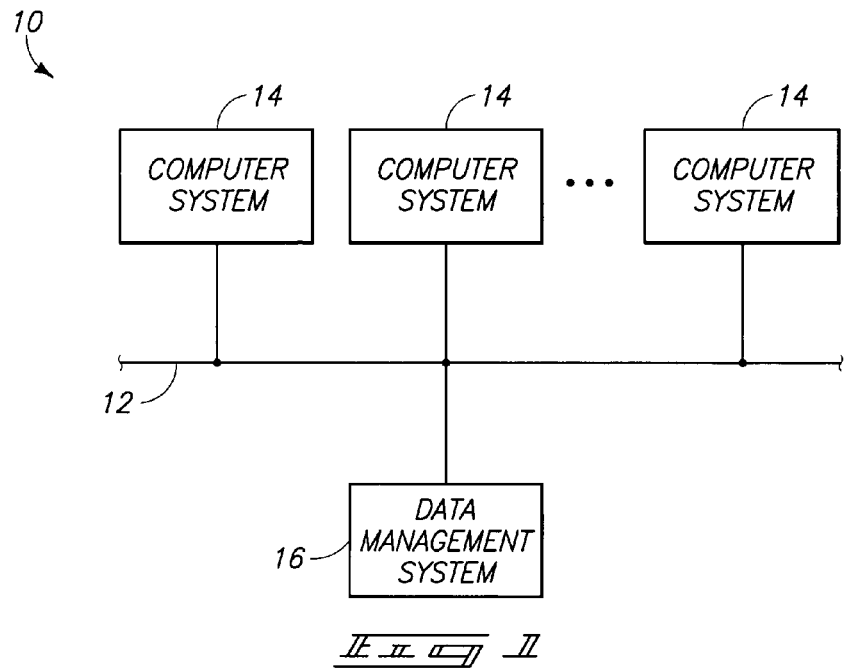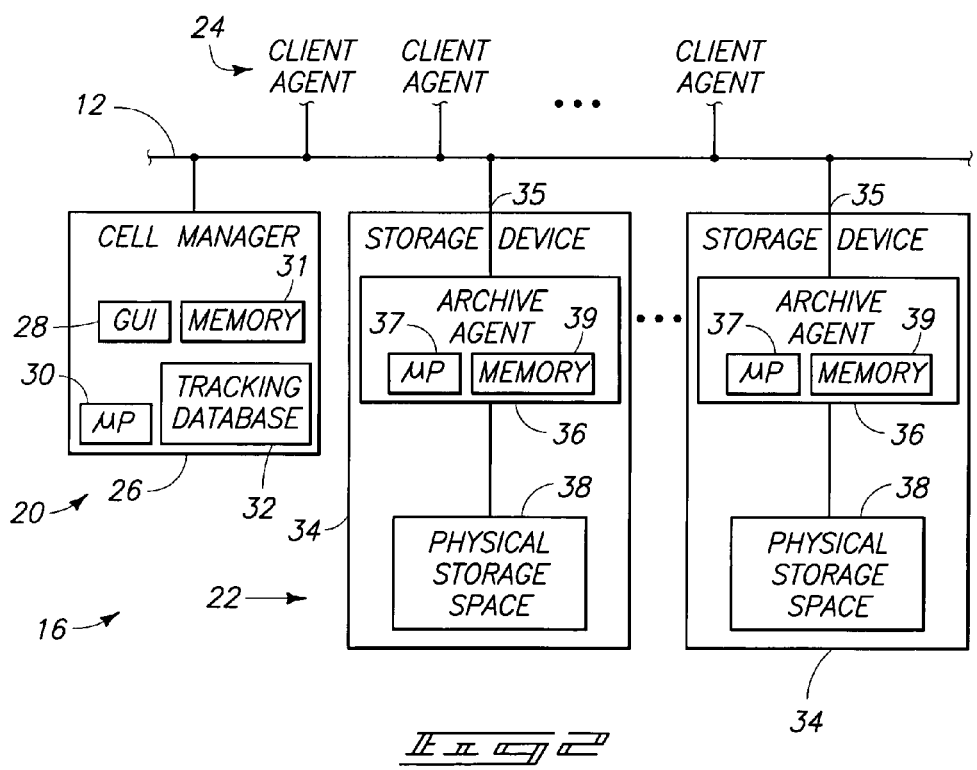

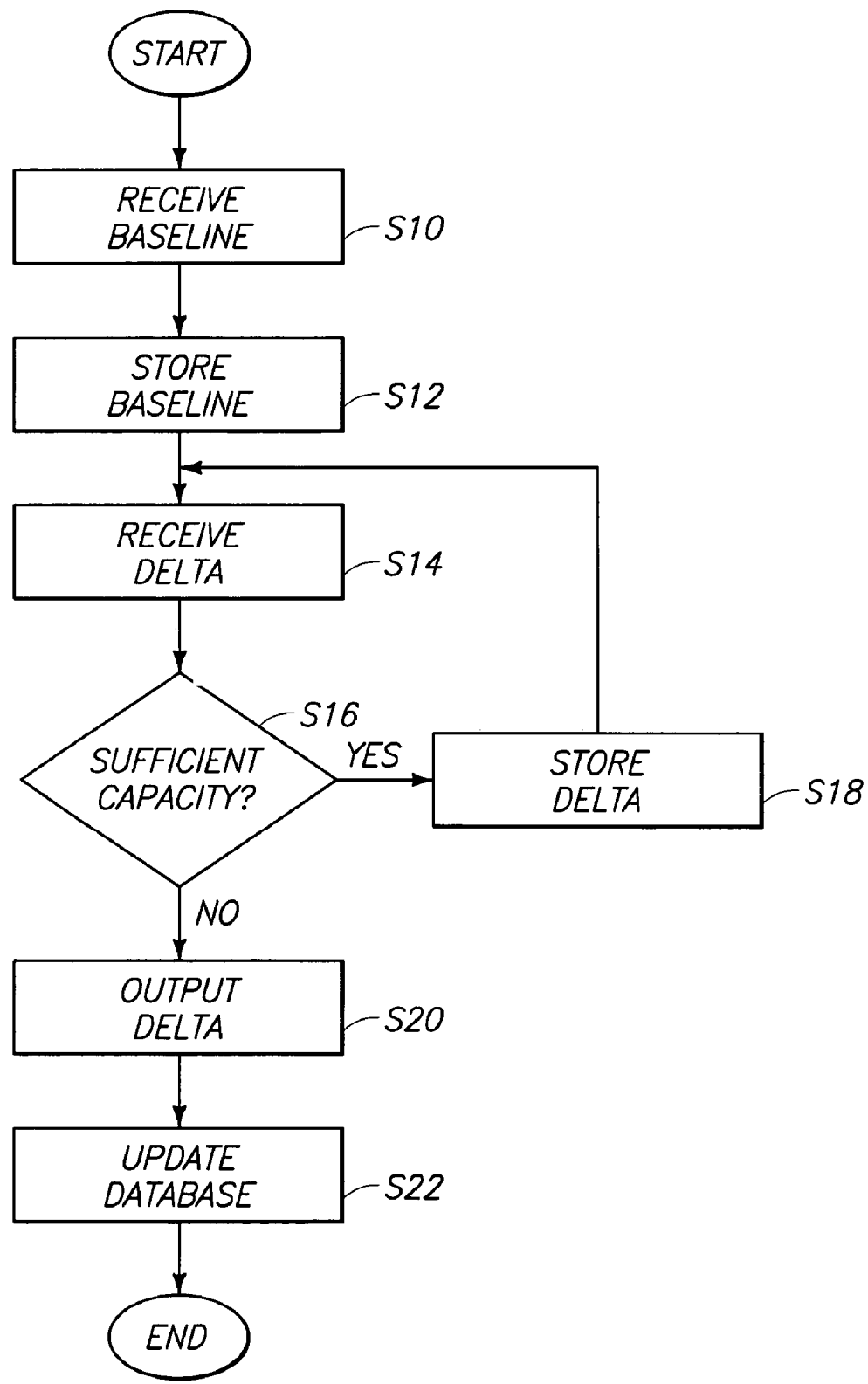

DATA MANAGEMENT SYSTEMS, DATA MANAGEMENT SYSTEM STORAGE DEVICES, ARTICLES OF MANUFACTURE, AND DATA MANAGEMENT METHODS

CROSS REFERENCE TO RELATED APPLICATIONS

This application is related to copending U.S. patent application Ser. No. 10/723,950 entitled "Data Management Systems, Articles Of Manufacture, And Data Storage Methods", listing Stephen Gold, Harald Burose, and Sebastien Schikora as inventors, which was filed concurrently and which is incorporated by reference herein.

FIELD OF THE INVENTION

At least some embodiments of the invention relate to data management systems, data management system storage devices, articles of manufacture, and data management methods.

BACKGROUND OF THE INVENTION

Reliable data protection solutions are becoming increasingly important as the usage of and reliance upon electronic data continue to increase. For example, data of numerous business processes may be entirely or substantially electronically stored. Exemplary processes including accounting systems, administrative (e.g., docketing, calendaring, record-keeping, etc.) systems, email systems, etc. may generate significant amounts of electronic data. It is important to protect against loss of the generated electronic data.

Accordingly, high capacity data protection storage devices are becoming commonplace in numerous implementations, such as libraries, and backup and archive configurations, for example. It is desired for these arrangements to provide storage capabilities with minimal interrupts of the host system being protected. Increased speed, accessibility and reliability are additionally desired for providing short or long-term storage of digital data.

Various types of storage media may be used in different data protection solutions. Exemplary types of media include disk and/or tape, although others may be used. Tape systems provide benefits of relatively simplistic design and reduced cost, but suffer from drawbacks of having relatively inflexible designs, and relatively slow speeds.

During an initial backup operation, data protection storage systems may store baseline versions of files. Thereafter, delta versions of the files may be created during subsequent backup operations which define differences between the subsequent versions of the files and the original versions of the respective files. If the capacity of a subsystem of a data protection storage system is consumed, backups with respect to the subsystem are halted, or data is moved to another subsystem and the changes may be recorded for subsequent retrieval. Such movement of data may be significant (e.g., all baselines and deltas for an entire protected computer dataset). Movement of significant amounts of data may require a relatively large amount of data traffic between plural subsystems and have a major impact on performance of the data protection storage system.

SUMMARY OF THE INVENTION

At least some embodiments of the present invention provide data management systems, data management system storage devices, articles of manufacture, and data management methods.

According to one embodiment of the invention, a data management system comprises a plurality of storage devices individually comprising a physical storage space, wherein the physical storage space of one of the storage devices is configured to store a baseline version of a data object and the physical storage space of an other of the storage devices is configured to store a delta version of the data object and processing circuitry configured to control storage operations of at least one of the storage devices, to process a restore request with respect to the data object, to access the delta version from the other of the storage devices responsive to the restore request, and to initiate communication of data of the baseline version and the delta version of the data object to a computer system.

According to another embodiment of the invention, an article of manufacture comprises a processor-usable medium comprising processor-usable code configured to cause processing circuitry of one of a plurality of storage devices of a data management system to receive a request to store a baseline version of a data object, effect storage of the baseline version using physical storage space of the one of the storage devices, receive a request to store a delta version of the data object after the effecting storage of the baseline version, accessing information regarding a status of the one of the storage devices, and initiate storage of the delta version using an other of the storage devices of the data.

According to an additional embodiment of the invention, a data management method comprises receiving a baseline version of a data object of a computer system using one of a plurality of storage devices of a data management system, storing the baseline version using the one of the storage devices after the reception of the baseline version, receiving a request using the one of the storage devices, wherein the request comprises a request to store a delta version of the baseline version, analyzing a capacity of the one of the storage devices, and storing the delta version using an other of the storage devices responsive to the analyzing.

Other embodiments are disclosed as is apparent from the following description.

DESCRIPTION OF THE DRAWINGS

FIG. 1 is a functional block diagram of an exemplary computer network according to one embodiment.

FIG. 2 is a functional block diagram of an exemplary data management system according to one embodiment.

FIG. 3 is a flow chart of an exemplary methodology for storing baseline and delta versions of a data object according to one embodiment.

DETAILED DESCRIPTION OF THE INVENTION

Figure 4:
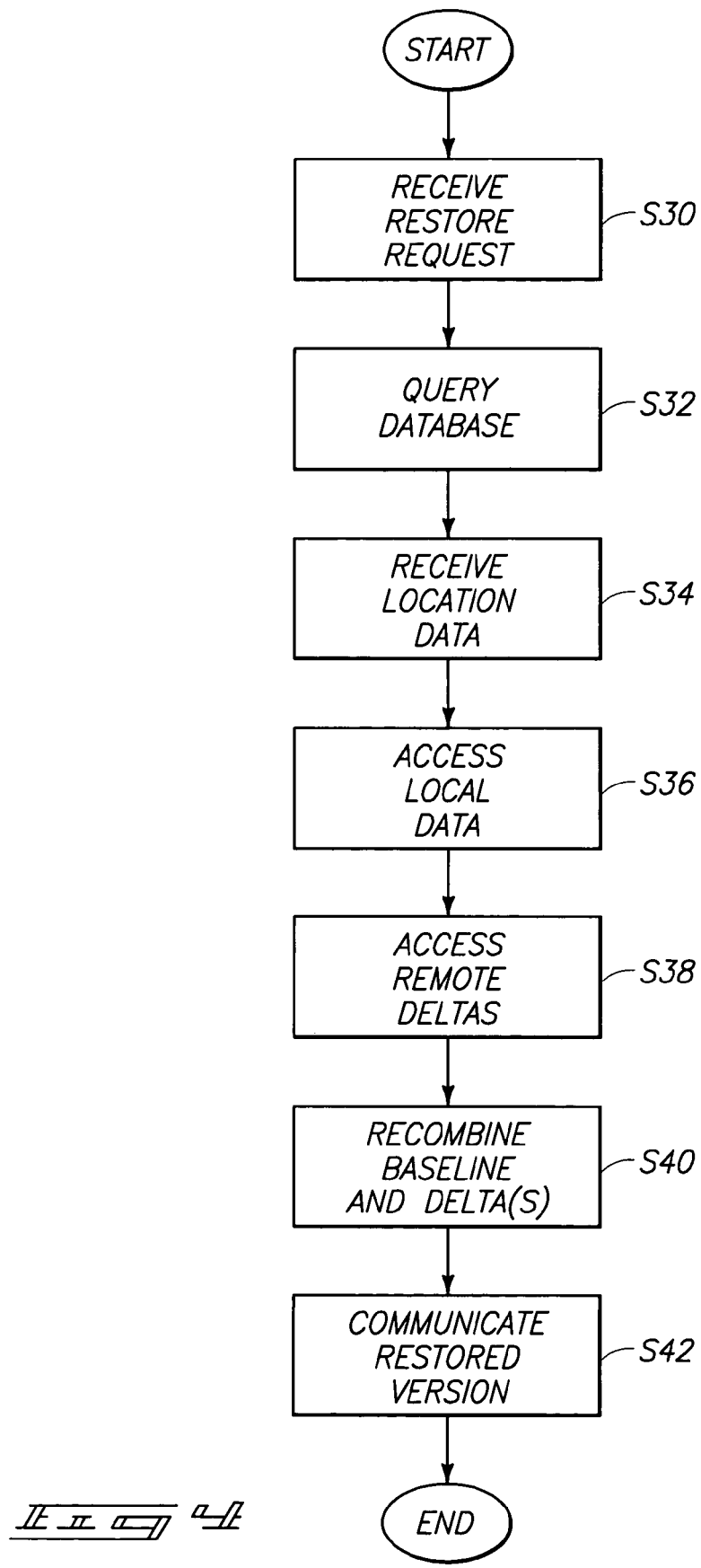
FIG. 4 is a functional block diagram of an exemplary methodology for restoring the data object according to one embodiment.

Referring to FIG. 1, a computer network 10 is shown according to one possible embodiment to depict exemplary embodiments described herein. Other configurations of computer network 10 are possible, including more, less, and/or alternative components. As shown, the exemplary computer network 10 includes a network connection 12, a plurality of computer systems 14, and a data management system 16. At least some computer systems 14 may be referred to as protected computer systems and data management system 16 may be referred to as a resource domain in one embodiment. Data management system 16 may be configured to implement backup methods including disk archive where multiple versions of backup data objects may be stored on physical storage space (e.g., hard disk). As described further below, versions stored can be entire data objects or pieces of data objects. In one embodiment, an original version of a data object may be provided at an initial moment in time and may be referred to as a baseline or baseline version. Some subsequent versions of the data object provided at subsequent moments in time may only reflect changes with respect to the baseline version as opposed to comprising an entire version of the data object and may be referred to as delta versions.

Network connection 12 is configured to implement data transfer between coupled devices. In one arrangement, network connection 12 provides communications between computer systems 14 and data management system 16. Network connection 12 may also provide data communication intermediate internal devices of data management system 16 described further below in accordance with exemplary embodiments. The network connection 12 may comprise a local area network (LAN) and/or a storage area network (SAN) in possible configurations.

Computer systems 14 are configured to generate electronic data to be stored for subsequent retrieval and access (e.g., backup, restore, etc.). Exemplary computer systems 14 may comprise personal computers, work stations, servers, combinations of such devices, and/or other electrical devices capable of providing or accessing electronic data. In one embodiment, computer systems 14 comprise respective electronic file systems or groups of electronic file systems.

Data management system 16 is configured to store (protect) electronic data of computer systems 14. Data management system 16 may operate to perform exemplary operations, such as backup and restore, with respect to electronic data of computer systems 14. Other operations may be provided.

As described below with respect to FIG. 2, data management system 16 may comprise resources configured to store a certain amount (e.g., bits or bytes) of electronic data. The data management system 16 accordingly may have a physical storage capacity corresponding to the physical size of the storage resources. In addition, data management system 16 may have a throughput or processing capacity corresponding to available data processing resources or additional quantifiable capacities in one embodiment.

Referring to FIG. 2, an exemplary configuration of a data management system 16 is shown. The depicted data management system 16 comprises storage control circuitry 20, a data storage system 22, and one or more client agent 24 coupled with network connection 12. Other arrangements of data management system 16 are possible.

In one embodiment, storage control circuitry 20 is implemented using a cell manager 26 comprising a server. An exemplary cell manager 26 comprises an interface 28, processing circuitry 30, memory 31, and a database 32.

Interface 28 is configured to display status information and receive user inputs in one arrangement. Interface 28 may be embodied as a graphical user interface (GUI) or other appropriate configuration.

Processing circuitry 30 is arranged to monitor and control operations of data management system 16. Processing circuitry 30 may be implemented using any appropriate configuration of hardware, software, and/or firmware to implement monitoring and control operations. For example, in the illustrated exemplary embodiment, processing circuitry 30 is implemented using a microprocessor. Memory 31 is configured to store processor-usable code or data for use by processing circuitry 30 in one embodiment.

Database 32 may be implemented in any appropriate medium and may be referred to as a tracking database. Database 32 is configured store configurations of the data management system 16, allocation of resources of system 16, relationship of the resources to computer systems 14, locations of stored data within system 16, and other desired data. As described further below, database 32 stores location information regarding locations of baseline versions and delta versions of data objects within respective ones of a plurality of storage devices 34 of the data management system 16. Individual storage devices 34 may comprise an interface 35, an archive agent 36, and a physical storage space 38 in but one arrangement.

Interface 35 is configured to implement external communications of storage device 34 with respect to client agents 24, cell manager 26, other storage devices 34, and other external devices. Interface 35 may comprise a network interface card (NIC) in one embodiment although other configurations to implement communications are possible.

Archive agents 36 access data from appropriate client agents 24 and control storage of the data within the respective physical storage spaces 38. Archive agents 36 control reading and writing operations with respect to the respective physical storage spaces 38. Archive agents 36 may implement communications of data with respect to other storage devices 34, implement data compression and decompression operations, and receive and/or output data to computer systems 14.

Archive agents 36 include respective processing circuits 37 configured to control operations of the respective data storage devices 34. Processing circuitry 37 may be arranged using any appropriate configuration of hardware, software, and/or firmware (e.g., microprocessor and appropriate programming in the illustrated example) to implement monitoring and control operations. Memory 39 of the individual archive agents 36 are configured to store processor-usable code usable by the respective processing circuits 37. Archive agents 36 may comprise servers in one embodiment.

Archive agents 36 may additionally perform maintenance operations with respect to the data stored using the respective storage spaces 38. For example, in one embodiment, a baseline or a base version of a data object (e.g., word processing document, email, etc.) is stored using one of the physical storage spaces 38 at an initial moment in time. A change to the data object provides a delta version at a subsequent moment in time which includes the respective changes to the baseline version. Archive agents 36 may perform re-baseline maintenance operations wherein delta changes are applied to original baselines of the data object, resulting in new baselines of the data objects at the moment of re-baselinings. In addition, the delta version(s) may be combined during restoration operations to provide restored versions of the baselines. For example, the archive agents 36 communicate compressed data comprising the baselines and the deltas to the client agents 14 for the restoration wherein the delta(s) are applied to the respective baselines during restoration operations providing restored versions of the data object. Alternately, archive agents 36 may perform recombination operations wherein the delta changes are applied to the baseline version of a data object to provide a restored version of the data object which may be communicated to a client agent 24. Further, archive agents 36 may implement interleaving operations to communicate compressed data to respective client agents 14.

Physical storage spaces 38 may be implemented using any appropriate storage medium. Hard disk storage media may be utilized in at least one embodiment, although other storage media are possible (e.g., tape, semiconductor, holographic, etc.). Data storage system 22 comprises one or more of the physical storage spaces 38 in one illustrative arrangement. Data storage system 22 is configured to store data of a plurality of client protect computer systems 14. One exemplary embodiment provides a resource domain wherein a plurality of storage devices 34 are aggregated together and associated with one (or more) cell manager 26.

During configuration of data management system 16, client agents 24 may be associated with respective ones of computer systems 14. Client agents 24 may comprise programming (e.g., software) modules installed upon the respective computer systems 14. Other arrangements are possible.

In one embodiment, client agents 24 are configured to provide data from the respective computer systems 14 to the storage devices 34 for storage. Client agents 24 operate to extract data from the respective computer system 14, to compress the data (if desired), and to forward the data to be protected to a respective archive agent 36 for storage. Data communicated from a plurality of client agents 24 to one or more storage devices 34 may be interleaved (e.g., a large number of systems 14 are sending delta versions) wherein compressed data from a plurality of systems 14 is communicated to storage device(s) 34 in a single sequential data transfer. During a restore, the archive agent 36 may resend the baseline and delta versions (potentially interleaved) to the respective client agents 14 in an appropriate order for the restore, or provide a complete restored version of the data object.

As described above, extracted and forwarded data may comprise original versions of data objects (baselines), and updated versions of the objects (deltas). Client agents 24 also operate to decompress received data from storage devices 34 (if the data is compressed) and to provide the data as live data for usage within the respective computer systems 14.

As mentioned previously, cell manager 26 may maintain a map of a distribution of the computer system 14 across the storage devices 34 using database 32 comprising a tracking database in one embodiment. As described further below, database 32 may store information regarding locations (e.g., identifying the storage devices 34) wherein delta versions and baseline versions are stored. The information may identify which storage devices 34 store baseline versions and respective delta versions for respective data objects. Cell manager 26 may be additionally configured to store information regarding associations of client agents 24 and computer systems 14 in tracking database 32. Accordingly, during exemplary storage operations, cell manager 26 maintains records in tracking database 32 identifying data objects and storage locations of data stored in the respective storage devices 34, including locations of baseline versions and delta versions of data objects.

In one embodiment, it may be desired to store all delta versions of a data object on the same storage device 34 which stores the respective baseline version of the data object. Such facilitates maintenance operations including, for example, re-baselining using the respective archive agent 36 of the storage device 34 or restoration. In addition, provision of the delta versions on the same storage device 34 which stores the baseline version minimizes degradation of LAN/SAN performance during maintenance processes (e.g., re-baselining) by providing internal data transfers within the respective storage device 34. Further, various pieces of a data object which are recombined for restore may be stored on different physical disk logical unit numbers (LUNs) if a common archive agent 36 is reading the data from the LUNs in one embodiment.

During data protection operations, resources of the data management system 16 including storage devices 34 are consumed. Consumed resources may include processing capacity (e.g., processing circuits 37) for processing operations with respect to protection of data, and storage capacity (e.g., physical storage space 38) for physically storing digital data. Over time, the amount of data to be protected of one or more computer system 14 typically increases. It may be possible to increase a capacity of physical storage space 38 (e.g., add additional disks) to accommodate the increased amount of data. Exemplary embodiments regarding scaling of storage resources according to one embodiment are described in a U.S. patent application Ser. No. 10/723,950, filed the same day as present application, entitled "Data Management Systems, Articles Of Manufacture, and Data Storage Methods,", naming Stephen Gold, Harald Burose, and Sebastien Schikora as inventors, and the teachings of which are incorporated herein by reference.

However, some storage device configurations have maximum capacities wherein data may be properly protected. At some threshold, limitations may be imposed by an inability to efficiently add additional physical storage space 38, to efficiently process input/output requests, or to efficiently perform other processing in a timely manner within respective processing circuits 37, and/or other limitations. Without limits, the storage device may be a performance bottleneck for backup and restore or other operations.

According to at least one embodiment, data management system 16 is configured to continue data protection operations with respect to a storage device 34 even though a capacity of the respective storage device 34 is at a limit (e.g., the consumption of capacity of a storage device 34 is approaching or has reached a limit). In one embodiment, a storage device 34 may receive a request to store a delta version of an internally-stored baseline version, but have insufficient capacity (e.g., physical space, processing, etc.) to accommodate storage of the delta version. As described further below, data management system 16 may store the delta version at another storage device 34.

Referring to FIG. 3, an exemplary method implemented by processing circuitry 37 of a given storage device 34 with respect to storage of a baseline version and respective delta version(s) of a single data object is shown. In the described exemplary embodiment, the physical storage space 38 of the storage device 34 comprising the processing circuitry 37 implementing the depicted method stores the baseline version of the data object, and this storage device 34 may be referred to as a primary storage device. Other storage devices 34 store delta versions of the baseline version and may be referred to as secondary or slave storage devices. Other methods are possible including more, less or alternative steps.

At a step S10, the processing circuitry receives a baseline version of a data object from a client agent.

At a step S12, the processing circuitry stores the baseline version using the associated physical storage space of the respective storage device. The processing circuitry may verify or otherwise indicate storage of the baseline version to the cell manager for tracking purposes using a tracking database.

At a step S14, the processing circuitry accesses a request to store a delta version corresponding to the stored baseline version of the data object.

At a step S16, the processing circuitry may initially attempt to store the delta version on the physical storage space of the primary storage device. The processing circuitry may monitor the capacity of the respective storage device. For example, the processing circuitry can obtain status information regarding processing and/or storage capacity of the storage device. Other methods may be used to provide capacity information.

If sufficient capacity exists (e.g., with respect to predefined limits), the processing circuitry may control the storage of the delta version using the physical storage space of the respective primary storage device at a step S18. The processing circuitry may then proceed to step S14 to process subsequently received delta versions.

Otherwise, if sufficient capacity does not exist, the processing circuitry proceeds in accordance with the described embodiment to a step S20 to output the delta version for storage using another storage device allocated to the same data protection solution as the primary storage device. The recipient storage device stores the delta version of the data object. In one embodiment, the processing circuitry selects the recipient storage device. In another embodiment, the cell manager may dictate the appropriate recipient storage device. Other implementations are possible.

At a step S22, the processing circuitry is configured to output information to the cell manager for use in updating the tracking database to reflect the appropriate storage location of the respective delta version within another storage device.

Referring to FIG. 4, an exemplary method implemented by processing circuitry 37 of the primary storage device 34 with respect to restoration of a data object is shown. Other methods are possible including more, less or alternative steps.

At a step S30, the processing circuitry accesses a restore request with respect to a given data object. In one configuration, the request for restoration is initially sent by a client agent to the primary storage device which stores the baseline version for the given data object.

At a step S32, the processing circuitry may query the tracking database of the cell manager to obtain location information or data indicating the storage locations of baseline versions and delta version(s) of the respective data object responsive to a request for restoration of the data object. The tracking database may identify the request as requesting restoration of a data object which has data stored on at least one secondary storage device (e.g., one or more delta versions) as well as the primary storage device (e.g., baseline version and one or more delta versions). According to at least one embodiment, the processing circuitry of the primary storage device may initiate a distributed restore operation to provide an accurate point-in-time version of the data object to be restored and which includes data stored on one or more other storage devices.

At a step S34, the processing circuitry operates to receive the location data from the cell manager and which identifies the stored locations (e.g., locations of the secondary storage devices) which store data (data of delta versions) for the respective data object being restored.

At a step S36, the processing circuitry accesses the locally stored baseline version and delta version(s), if any, from the respective physical storage space of the primary storage device.

At a step S38, the processing circuitry accesses the remotely stored delta version(s) (i.e., delta version(s) not stored using the physical storage space of the primary storage device) using the location data obtained from the cell manager. In one embodiment, the processing circuitry of the primary storage device controls the respective primary storage device to operate as a proxy with respect to the secondary storage device(s) to extract the remotely stored delta version(s).

In one delta version data retrieval embodiment, the primary storage device sends one or more requests to secondary storage devices to provide specific delta versions. Responsive to receiving a request within a secondary storage device, the processing circuitry of the secondary storage device may retrieve the delta version and prepare the delta version for communication to the primary storage device as opposed to combining the delta version with other data during a typical restore operation. In some configurations, the stored delta version data may be compressed. In one embodiment, the archive agent of the secondary storage device may uncompress the delta version data before communicating the data to the primary storage device. In another embodiment, compressed data is communicated from the secondary storage device to the primary storage device.

At a step S40, the processing circuitry executes a recombination procedure to combine the data of the baseline version with the data of the accessed local and remote delta version(s) to provide a restored version of the data object.

At a step S42, the processing circuitry controls communication of the restored version of the data object to the appropriate client agent or other recipient.

Processing circuitry of the primary storage device may also verify the consistency of the data to be restored. In one embodiment, the processing circuitry of the primary storage device uses a Cyclic Redundancy Check (CRC) to verify the signature delta blocks, as well as an overall CRC to verify correct restoration of a complete restored data object. More specifically, the processing circuitry of the primary storage device may check the CRC data of the delta versions as they are read from the secondary storage devices, and a file-level CRC may be generated in real time as the data object is being re-combined prior to restoration.

Delta versions may be communicated from secondary storage devices to the primary storage device using a plurality of different processes. A LAN-based process or SAN-based process may be used in illustrative examples.

In one exemplary LAN-based restore, a secondary storage device can extract requested delta versions from the associated physical storage space and provide the delta version data in a compressed state in one embodiment. For example, the data may have been extracted in a compressed state, or the processing circuitry of the secondary storage device may compress the data if it was uncompressed during extraction, or is otherwise provided in an uncompressed state. The compressed data of the delta version(s) may be communicated over a LAN of network connection to the primary storage device. The processing circuitry of the primary storage device may recombine delta versions read from the secondary storage devices with the baseline and delta versions stored using the primary storage device. The primary storage device may thereafter forward the restored data object as compressed data to a respective client agent. The recipient client agent may de-compress the data before writing it disk or other storage of the respective computer system. The client agent may provide the restored data in the same format as the original data object (e.g., file, raw volume for raw databases, or imported into an email application for single email objects).

In another embodiment, a SAN-based restore may be used for some types of data objects (e.g., excluding single emails which may be imported via an email application or raw data in one embodiment). For example, the physical storage space of a target computer system may be coupled with a SAN of the network connection. The primary and secondary storage devices may also be operatively coupled with the same SAN of the network connection. Processing circuitry of the secondary storage devices may operate to de-compress the delta version data prior to communication via SAN data movers to the primary storage device. Processing circuitry of the primary storage device may operate to uncompress locally stored baseline and delta version data, and combine the data with uncompressed data received from the secondary storage devices. Following restoration, the primary storage device may communicate the restored version of the data object as uncompressed data to the appropriate client agent and computer system using SAN data movers in the described embodiment.

According to the illustrative SAN-based restore, the processing circuitry of the primary storage device may store restored data objects to a scratch area of its associated physical storage space (or other storage), and transfer portions (e.g., 100 MB) of the restored data objects over the SAN as subsequent portions are decompressed and/or recombined. Similar communications may be provided intermediate secondary storage devices and the primary storage device wherein the second storage devices may communicate uncompressed delta version data over the SAN to scratch space on the physical storage space of the primary storage device. This exemplary SAN configuration removes significant data transfer from the LAN or other connections, but provides communication of twice the amount of data compared with compressed communications and the archive agent of the primary storage device may bottleneck data transfer.

The client agent of the respective target computer system to receive the restored data object may reserve space on a physical array LUN for data objects to be restored using SAN-based restore. The respective client agent may operate as a resolve agent to decode a layout of volumes on primary disk LUNs to identify a list of physical blocks receiving the restored data transferred via the SAN data movers.

In another embodiment, one or more of the client agents may be configured to implement distribution of delta version data using a plurality of storage devices. In one implementation, the client agent may operate as a proxy to extract delta versions from the storage devices, and perform recombination operations of the baseline version and the delta versions. Data transfer intermediate the storage devices and the appropriate client agent may be performed using a LAN of the network connection inasmuch as the client agent may be performing the recombination operations and writing of the restored data to primary disk of the computer system and independent data transfer (e.g., SAN data movers) is not utilized in one example. Restoration operations may slow performance of the LAN and client agent, and raw disk data objects may be more difficult to restore in embodiments wherein raw disk data objects are stored as whole LUNs permitting copying of such objects to file systems of the client agent.

At least some embodiments described herein may be implemented using processor-usable code or executable code stored within appropriate storage devices, or communicated via a network or using other transmission media, and configured to control appropriate processing circuitry. For example, processor-usable code may be provided via articles of manufacture, such as an appropriate processor-usable medium, or alternately embodied within a data signal (e.g., carrier wave, data packets, etc.) communicated via appropriate media, such as a communication network (e.g., the Internet and/or a private network) or other communication structure. Processor-usable media may include any media which can contain, store, or maintain programming for use by or in connection with an instruction execution system including processing circuitry in the exemplary embodiment. For example, exemplary processor-usable media may include any one of physical media such as electronic, magnetic, optical, electromagnetic, infrared, or semiconductor media. Some more specific examples of processor-usable media include, but are not limited to, a portable magnetic computer diskette such as a floppy diskette, or zip disk, hard drive, random access memory, read only memory, flash memory, erasable programmable read only memory, optical disk, or other configurations capable of storing programming, data, or other digital information.

According to at least some embodiments of the disclosure, solutions are provided for providing storage operations wherein a storage device of a data management system has reached a state wherein additional data may not be stored using the respective storage device. In one embodiment, an end user may scale the capacity of the data management system without having to reconfigure associations of individual storage devices to respective computer systems, and thereby avoid communication of a large amount of protected computer datasets intermediate plural storage devices. Additionally, performance degradation resulting from movement of significant amounts of data may be avoided.

The protection sought is not to be limited to the disclosed embodiments, which are given by way of example only, but instead is to be limited only by the scope of the appended claims.

What is claimed is:

1. A data management system comprising:
a plurality of storage devices individually comprising a physical storage space, wherein the physical storage space of a first storage device of the plurality of storage devices is configured to store a baseline version of a data object and the physical storage space of a second storage device of the plurality of storage devices is configured to store at least one of a plurality of delta versions of the data object in response to a determination that available storage space on at least one of the plurality of storage devices does not currently exist with respect to pre-defined storage limits; and
processing circuitry configured to control storage operations of at least one of the plurality of storage devices to process a restore request with respect to the data object, to access the delta versions from the second storage device of the plurality of storage devices responsive to the restore request, wherein accessing the delta versions includes querying a tracking database of a cell manager to obtain data indicating storage locations of the delta versions, and to initiate communication of data of the baseline version and the delta versions of the data object to a computer system, wherein the processing circuitry is further configured to act as a proxy to extract remotely stored delta versions, wherein restoring the data object includes combining the baseline version of the data object with the remote delta versions of the delta object.

2. The data management system of claim 1, wherein a client agent of the computer system is configured to combine the delta versions with the baseline version to provide a restored version of the data object.

3. The data management system of claim 1, wherein the processing circuitry comprises processing circuitry of the first storage device of the plurality of storage devices which stores the baseline version of the data object.

4. The data management system of claim 3, wherein the the first storage device of the plurality of storage devices is configured to receive at least one of the delta versions from the computer system, and the processing circuitry is configured to forward the at least one of the delta versions to the second storage device of the plurality of storage devices.

5. The data management system of claim 4, wherein the processing circuitry is configured to forward the at least one of the delta versions to the second storage device of the plurality of storage devices responsive to a status of capacity of the first storage device of the plurality of storage devices.

6. The data management system of claim 4, further comprising a database configured to store information regarding storage operations of each of the plurality of storage devices, and wherein the processing circuitry is configured to access the database to obtain a location of the at least one of the delta versions of the data object on the second storage device of the plurality of storage devices responsive to the restore request.

7. The data management system of claim 1, wherein the processing circuitry comprises processing circuitry of a client agent associated with the computer system.

8. The data management system of claim 1, further comprising a local area network configured to communicate at least one of the delta versions intermediate the first storage device of the plurality of storage devices and the second storage device of the plurality of storage devices.

9. The data management system of claim 1, further comprising a storage area network configured to communicate at least one of the delta versions, intermediate the first storage device of the plurality of storage devices and the second storage device of the plurality of storage devices.

10. The data management system of claim 1, wherein the computer system is a host device external of the data management system.

11. The data management system of claim 1, wherein the computer system, is a host device external of the data management system and the computer system is configured to execute an application program to generate the baseline and delta versions of the data object.

12. The data management system of claim 1, wherein the data object comprises a data file.

13. The data management system of claim 1, wherein the data object comprises a data file and the delta version of the data file only comprises changes made to the baseline version of the data file.

14. The data management system of claim 13, wherein the delta version of the data file does not include content of the data file which is unchanged with respect to the baseline version of the data file.

15. The data management system of claim 1, further comprising a client agent of a target computer configured to receive a restored data object.

16. A data management system comprising:
a hardware memory component;
a plurality of storage subsystems;
storage means for storing data corresponding to a plurality of data objects;
processing means for controlling storage operations with respect to the hardware memory component; and
database means for tracking storage locations of data of the data objects in the corresponding plurality of storage subsystems;
wherein the processing means of a first subsystem of the plurality of storage subsystems includes means for controlling the storage of a baseline version of a data object using the storage means corresponding to the first subsystem of the plurality of storage subsystems and means for initiating the storage of a delta version of the data object using a second subsystem of the plurality of storage subsystems;
wherein the database means comprises means for storing information regarding the storage location of the delta version using the second subsystem of the plurality of storage subsystems; and
wherein the processing means outputs the delta version to the second subsystem of the plurality of storage subsystems after determining that insufficient storage capacity exists at the first subsystem of the plurality of storage subsystems to store the delta version, wherein the processing means is further configured to verify storage of the baseline version of data with a manager means for tracking purposes using the database means, wherein the processing means is further configured to query a tracking database of a cell manager to obtain data indicating storage locations for the delta version.

17. The data management system of claim 16, wherein the processing means of the second subsystem of the plurality of storage subsystems comprises means for uncompressing data of the delta version, and means for initiating communication of the uncompressed data of the delta version to the first storage subsystem of the plurality of storage subsystems.

18. The data management system of claim 16, wherein the processing means for the first subsystem of the plurality of storage subsystems comprises means for accessing the database, and means for forwarding a request to the second subsystem of the plurality of storage subsystems to obtain the delta version from the second subsystem of the plurality of storage subsystems responsive to the accessing the database.

19. The data management system of claim 16, wherein the processing means for the first subsystem of the plurality of storage subsystems comprises means for generating a restored version of the data object using the baseline version and the delta version, and means for outputting the restored version of the data object to a computer system.

20. A data management system storage device comprising:
an interface configured to communicate data with respect to other storage devices of a data management system, and to communicate data of a data object with respect to a computer system;
a physical storage space configured to store a baseline version of the data object at an initial moment in time; and
processing circuitry configured to receive a request to store a delta version of the data object at a subsequent moment in time after the initial moment in time, to obtain information regarding a capacity of a storage device, and to initiate storage of the delta version of the data object using one of the other storage devices of the data management system responsive to an analysis of the obtained information, wherein the processing circuitry outputs the delta version to the one of the other storage devices after determining that insufficient storage capacity exists at the storage device to store the delta version, the processing circuitry being further configured to verify storage of the baseline version of the data object with a cell manager for tracking purposes using a tracking database, the processing circuitry further configured to query a tracking database of the cell manager to obtain data indicating storage locations of the delta version.

21. The data management system storage device of claim 20, wherein the processing circuitry is configured to access the tracking database to identify a storage location of the delta version, and to output a request to access the delta version to the other storage devices responsive to the accessing the tracking database.

22. The data management system storage device of claim 20, wherein the processing circuitry is configured to combine the delta version with the baseline version to generate a restored version of the data object and to control communicating of the restored version of the data object to the computer system.

23. The data management system storage device of claim 20, wherein the processing circuitry is configured to initiate the storage using the other storage devices responsive to the obtained information indicating insufficient capacity to accommodate storage of the delta version.

24. The data management system storage device of claim 20, wherein the processing circuitry is configured to obtain the information regarding the capacity of the storage device responsive to the request.

25. A computer-readable storage medium that stores a program that, when executed by a computer, causes processing circuitry of a first storage device of a plurality of storage devices of a data management system to:
   receive a request to store a baseline version of a data object;
   store the baseline version using physical storage space of the the first storage device of the plurality of storage devices;
   receive a request to store a delta version of the data object after effecting storage of the baseline version;
   access information regarding a storage capacity status of the first storage device of the plurality of storage devices;
   determine the first storage device of the plurality of storage devices has insufficient storage capacity to store the delta version;
   store the delta version using a second storage device of the plurality of storage devices of the data management system after determining that the storage device of the plurality of storage devices has insufficient storage capacity to store the delta version; and
   verify storage of the baseline version of the data object with a cell manager for tracking purposes using a tracking database, wherein the processing circuitry is further configured to query the tracking database of the cell manager to obtain data indicating storage locations of the stored delta version.

26. The computer-readable storage medium of claim 25, wherein the program is configured to cause the processing circuitry to access the delta version stored using the second storage device of the plurality of storage devices, and to control communication of data of the baseline version and the delta version to a computer system.

27. The computer-readable storage medium of claim 26, wherein the program is configured to cause the processing circuitry to combine the delta version and the baseline version before the communication.

28. The computer-readable storage medium of claim 25, wherein the program is configured to cause the processing circuitry to initiate the storage responsive to the accessed information indicating insufficient capacity of the first storage device of the plurality of storage devices to accommodate storage of the delta version.

29. The computer-readable storage medium of claim 25, wherein the program further causes the processing circuitry of the first storage device of the plurality of storage devices to access the information regarding the status comprising capacity information of the first storage device of the plurality of storage devices responsive to receiving the request to store the delta version, and wherein the initiation of the storage of the delta version responsive to analysis of the capacity information.

30. The computer-readable storage medium of claim 25, wherein initiating the storage of the delta version using the second storage device of the plurality of storage devices responsive to the information includes indicating that the first storage device of the plurality of storage devices has insufficient capacity to store the delta version.

31. The computer-readable storage medium of claim 25, wherein the program further causes the processing circuitry of the first storage device of the plurality of storage devices to initiate the storage of the delta version using the second storage device of the plurality of storage devices to provide increased storage capacity of the data management system.

32. A data management method comprising:
   receiving a baseline version of a data object of a computer system using a first storage device of a plurality of storage devices of a data management system;
   storing the baseline version using the first storage device of the plurality of storage devices after the reception of the baseline version;
   receiving a request using the one first storage device of the plurality of storage devices, wherein the request comprises a request to store a delta version of the baseline version;
   analyzing a capacity of the first storage device of the plurality of storage devices;
   determining the first storage device of the plurality of storage devices has insufficient storage capacity to store the delta version;
   storing the delta version using a second storage device of the plurality of storage devices after determining that the first storage device of the plurality of storage devices has insufficient storage capacity to store the delta version;
   verifying storage of the baseline version of the data object with a cell manager for tracking purposes using a tracking database; and
   processing a restore request, wherein processing the restore request includes querying the tracking database of the cell manager to obtain data indicating storage locations of the delta version.

33. The data management method of claim 32, further comprising combining the delta version with the baseline version providing a restored version of the data object.

34. The data management method of claim 33, wherein the combining comprises combining using the first storage device of the plurality of storage devices.

35. The data management method of claim 33, wherein the combining comprises combining using a client agent of the computer system.

36. The data management method of claim 33, further comprising maintaining a database of a stored location of the delta version, and wherein the combining comprises accessing the database using the first storage device of the plurality of storage devices to identify the stored location of the delta version.

37. The data management method of claim 36, further comprising: outputting a request from the first storage device of the plurality of storage devices to the second storage device of the plurality of storage devices responsive to the identification of the stored location; and communicating the delta version from the other of the plurality of storage devices to the first storage device of the plurality of storage devices responsive to the request.

38. The data management method of claim 32, further comprising forwarding the delta version from the first storage device of the plurality of storage devices to the second storage device of the plurality of storage devices.

39. The data management method of claim 38, wherein the forwarding comprises forwarding responsive to the determining that an insufficient capacity of the first storage device of the plurality of storage devices exists.

* * * * *

UNITED STATES PATENT AND TRADEMARK OFFICE
CERTIFICATE OF CORRECTION

| | | |
|---|---|---|
| PATENT NO. | : 7,657,533 B2 | Page 1 of 1 |
| APPLICATION NO. | : 10/723949 | |
| DATED | : February 2, 2010 | |
| INVENTOR(S) | : Stephen Gold et al. | |

It is certified that error appears in the above-identified patent and that said Letters Patent is hereby corrected as shown below:

In column 10, line 66, in Claim 4, delete "the the" and insert -- the --, therefor.

In column 13, line 25, in Claim 25, delete "the the" and insert -- the --, therefor.

Signed and Sealed this

Eleventh Day of May, 2010

David J. Kappos
*Director of the United States Patent and Trademark Office*